United States Patent
Zhao et al.

(10) Patent No.: US 10,936,467 B2
(45) Date of Patent: Mar. 2, 2021

(54) TOPOLOGY AWARE REAL TIME GPU-TO-GPU TRAFFIC MONITORING METHOD AND ANALYZING TOOLS

(71) Applicant: Dell Products L.P., Round Rock, TX (US)

(72) Inventors: Junping Frank Zhao, Beijing (CN); Yunfan Han, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/381,924

(22) Filed: Apr. 11, 2019

(65) Prior Publication Data

US 2020/0327036 A1    Oct. 15, 2020

(51) Int. Cl.
| | | |
|---|---|---|
| *G06F 9/46* | (2006.01) | |
| *G06F 11/34* | (2006.01) | |
| *G06F 11/30* | (2006.01) | |
| *G06T 1/20* | (2006.01) | |
| *G06F 9/48* | (2006.01) | |

(52) U.S. Cl.
CPC ........ *G06F 11/3495* (2013.01); *G06F 9/4843* (2013.01); *G06F 11/3024* (2013.01); *G06F 11/3065* (2013.01); *G06F 11/3433* (2013.01); *G06T 1/20* (2013.01)

(58) Field of Classification Search
None
See application file for complete search history.

(56) References Cited

U.S. PATENT DOCUMENTS

| | | | | |
|---|---|---|---|---|
| 7,865,908 | B2 * | 1/2011 | Garg | G06F 9/45537 718/1 |
| 9,274,852 | B2 * | 3/2016 | Song | G06F 9/5077 |
| 2004/0061701 | A1 * | 4/2004 | Arquie | H04L 43/0882 345/440 |
| 2005/0005271 | A1 * | 1/2005 | Clymer | H04L 41/5016 718/1 |
| 2007/0100962 | A1 * | 5/2007 | Barth | G06F 16/9535 709/217 |
| 2018/0270118 | A1 * | 9/2018 | Lee | H04L 41/0896 |

OTHER PUBLICATIONS

Dell EMC Ready solution for AI: https://www.emc.com/collateral/solution-overview/ready-solns-for-ai-machinedeep-learning-sol-overview.pdf.
Dell C4140 server with multi-GPU: https://www.dell.com/support/article/uk/en/ukbsdt1/sln312393/new-nvidia-v100-32gb-gpus-initial-performance-results?lang=en.

* cited by examiner

*Primary Examiner* — Gregory A Kessler
(74) *Attorney, Agent, or Firm* — Jackson Walker L.L.P.

(57) ABSTRACT

An information handling system may include at least one central processing unit (CPU), and a plurality of special-purpose processing units. The information handling system may be configured to: repeatedly monitor amounts of data traffic exchanged between respective pairs of the special-purpose processing units during selected time periods; based on the monitored amounts of data traffic, determine an amount of traffic imbalance for the plurality of special-purpose processing units; and in response to the amount of traffic imbalance exceeding a threshold amount, transmit a notification indicative of the amount of traffic imbalance.

18 Claims, 4 Drawing Sheets

TOPOLOGY AWARE REAL TIME GPU-TO-GPU TRAFFIC MONITORING METHOD AND ANALYZING TOOLS

TECHNICAL FIELD

The present disclosure relates in general to information handling systems, and more particularly to systems and methods for monitoring the execution of programs on special-purpose processing units such as graphics processing units (GPUs).

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is becoming more common for information handling systems to include special-purpose processing units. Throughout this disclosure, for the sake of concreteness, the specific example of GPUs will be discussed in detail. One of ordinary skill in the art with the benefit of this disclosure will understand its application to other types of special-purpose processing units.

Multi-GPU systems, for example, may provide very high computation density, as well as fast interconnections (e.g., NVIDIA® NVLink 2.0). This makes such systems particularly useful in fields such as distributed deep learning training. For example, such systems may in some embodiments be used for general-purpose computing on graphics processing units (GPGPU) tasks.

However, existing solutions lack the capability of real-time or near-real-time GPU-to-GPU traffic monitoring and analytics, which limits the ease of system management and troubleshooting.

Some existing solutions may provide near-real-time traffic monitoring between a host processor and a GPU, but they lack such traffic monitoring for GPU-to-GPU data.

Other existing solutions may require changes to the application code being run on the GPU, or to the deep learning model/framework coding to trace GPU-to-GPU traffic at the application level. But such changes involve considerable engineering efforts.

Yet other existing solutions may enable detailed GPU profiling at a low-level API, but may also lead to unacceptable performance decreases at runtime. These and other drawbacks limit the actual usage of existing solutions in fields where it is important not to make large code changes or to cause large performance impacts.

Embodiments of this disclosure may provide real-time or near-real-time (e.g., second-by-second) GPU-to-GPU traffic monitoring and traffic analytics capabilities. For example, according to this disclosure, traffic imbalance detection, relative GPU utilization levels, performance abnormality detection, error rate detection, etc., may run with GPU topology awareness, low overhead, and configurable policies. For example, user-configurable policies may be implemented to vary the monitoring interval, the criteria for sending alerts, etc.

Embodiments of this disclosure may have a very small impact on existing applications, require no modification of application source code, may be integrated into system/cluster management systems, and may provide substantial benefits in the fields of artificial intelligence and high-performance computing.

Embodiments of the present disclosure may be used in various situations, such as using a parameter server for GPU-to-GPU data exchange, or performing Ring-AllReduce via NVIDIA's® NCCL or peer-to-peer (e.g., using Message Passing Interface (MPI)), etc. Fully leveraging multi-GPU systems may enable much better scalability, especially for large models (e.g., VGG) and model parallelism.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with the use of special-purpose processing units may be reduced or eliminated.

In accordance with embodiments of the present disclosure, an information handling system may include at least one central processing unit (CPU), and a plurality of special-purpose processing units. The information handling system may be configured to: repeatedly monitor amounts of data traffic exchanged between respective pairs of the special-purpose processing units during selected time periods; based on the monitored amounts of data traffic, determine an amount of traffic imbalance for the plurality of special-purpose processing units; and in response to the amount of traffic imbalance exceeding a threshold amount, transmit a notification indicative of the amount of traffic imbalance.

In accordance with these and other embodiments of the present disclosure, a method may include repeatedly monitoring amounts of data traffic exchanged between respective pairs of a plurality of special-purpose processing units of an information handling system during selected time periods; based on the monitored amounts of data traffic, determining an amount of traffic imbalance for the plurality of special-purpose processing units; and in response to the amount of traffic imbalance exceeding a threshold amount, transmitting a notification indicative of the amount of traffic imbalance.

In accordance with these and other embodiments of the present disclosure, an article of manufacture may include a non-transitory, computer-readable medium having computer-executable code thereon that is executable by a processor of an information handling system for: repeatedly monitoring amounts of data traffic exchanged between respective pairs of a plurality of special-purpose processing units of the information handling system during selected time periods; based on the monitored amounts of data traffic, determining an amount of traffic imbalance for the plurality of special-purpose processing units; and in response to the amount of traffic imbalance exceeding a threshold amount, transmitting a notification indicative of the amount of traffic imbalance.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
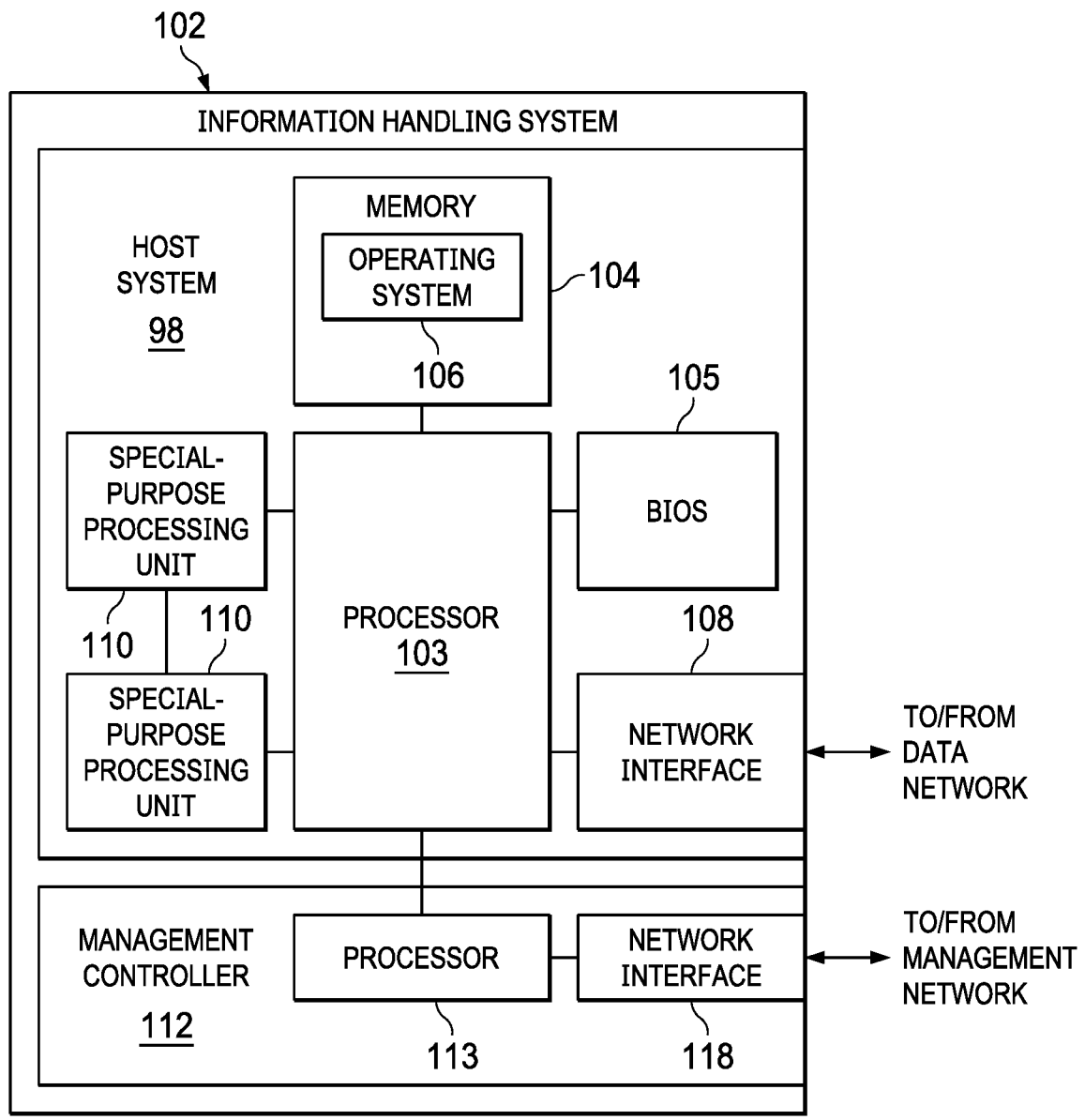
FIG. 1 illustrates a block diagram of an example information handling system, in accordance with embodiments of the present disclosure.

Preferred embodiments and their advantages are best understood by reference to FIGS. 1 through 5, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Figure 2A:
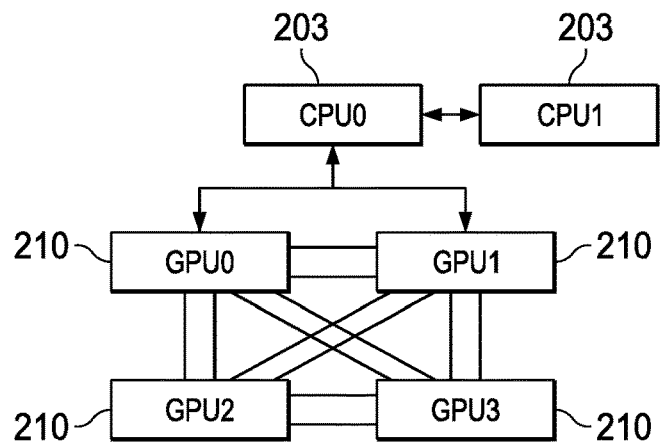
FIGS. 2A and 2B illustrate block diagrams of example information handling systems having different topologies, in accordance with embodiments of the present disclosure.
Figure 2B:
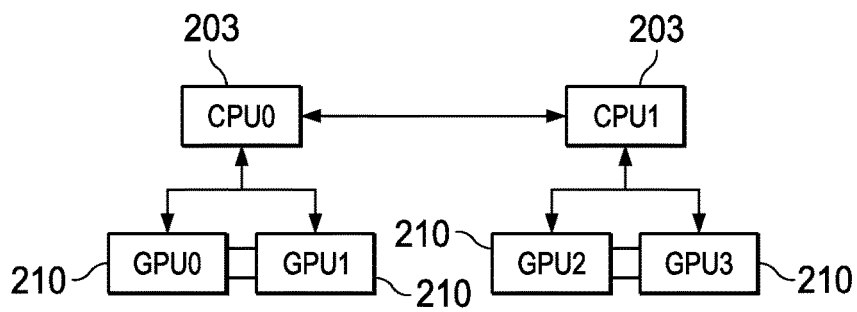

Special-purpose processing units 110 may include any type of processor other than a central processing unit (CPU). For example, special-purpose processing units 110 may include GPUs. Such GPUs may in various embodiments be integrated into a motherboard or backplane, be implemented on separate expansion cards (e.g., PCIe cards), or be implemented on a single expansion card. In some embodiments, although not illustrated in FIG. 1, special-purpose processing units 110 may also be coupled to processor 113 of management controller 112. Although FIG. 1 illustrates one processor 103 and two special-purpose processing units 110, one of ordinary skill in the art will understand that any suitable number of such devices may be used. For example, FIGS. 2A and 2B illustrate embodiments with two processors 203 (corresponding to processor 103) and four GPUs such as special-purpose processing units 210 (corresponding to special-purpose processing units 110).

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed in further detail below, embodiments of this disclosure provide various features for monitoring, analysis, and management of special-purpose processing units 110. These features may be implemented, in various embodiments, via code executable on processor 103 of host system 98 and/or on processor 113 of management controller 112.

Turning now to FIGS. 2A and 2B, embodiments are shown of information handling systems that include two processors 203 (shown as CPU0 and CPU1) and four special-purpose processing units 210 (shown as GPU0, GPU1, GPU2, and GPU3). A difference between the system of FIG. 2A and the system of FIG. 2B is in the topology of special-purpose processing units 210. In FIG. 2A, each special-purpose processing unit 210 is coupled to every other special-purpose processing unit 210 (e.g., via a high-bandwidth link such as NVLink 2.0). In FIG. 2B, by contrast, the special-purpose processing units 210 are coupled to one another only pairwise. As shown, the couplings from special-purpose processing units 210 to processors 203 (e.g., via one or more PCIe switches) are also different in the two topologies shown. In both embodiments, CPU-to-CPU links (which may be, for example, QuickPath Interconnect links) are also present.

Additional differences such as different types of data links, are also possible in some embodiments. These differences are also broadly considered to be differences in topology. For example, PCIe links may be used in some embodiments instead of vendor-specific links such as NVLink/NVLink 2.0/etc.

As discussed in more detail below, the systems and methods of this disclosure may detect any of such differing topologies and provide analytics based thereon. For example, embodiments of this disclosure may provide a map of the GPU interconnect topology to analyze any suspect performance behavior. Further, embodiments may illustrate traffic or performance status intuitively, e.g., by highlighting elements in different colors (e.g., red for alarm, yellow for warning, green for normal, etc.). Further, embodiments of this disclosure may buffer the traffic statistics and provide real-time or near-real-time analytics on-the-fly, including traffic imbalance detection, bottleneck detection, performance alarms, error rate alerts, etc.

In some embodiments, compute-intensive processing may be carried out on systems such as those shown in FIG. 2A and FIG. 2B. For example, a large amount of parameter exchanging may happen using the GPU-to-GPU links. For data parallelism distributed training, for example, each special-purpose processing unit 210 may load the same model with different training data. After each mini-batch, the different special-purpose processing units 210 may need to exchange intermediate results (e.g., stochastic gradient descent (SGD) results) via GPU-to-GPU interconnections. Such exchange may in some embodiments bypass processors 203 altogether in peer-to-peer fashion (e.g., if the special-purpose processing units 210 are within the same PCIe root complex). For model parallelism embodiments, even more GPU-to-GPU traffic may be needed for both gradient exchange and intermediate tensors (e.g., across deep neural network (DNN) layers).

When a user is trying to tune a model to have it run on multiple special-purpose processing units 210 (such as on multi-GPU expansion cards), some common challenges of scalability include the performance of parameter sync-up and efficiency between GPU devices. Accordingly, it may be beneficial to obtain real-time or near-real-time GPU-to-GPU traffic monitoring data method for diagnostic purposes. Such data may help answer questions regarding the amount of data being transferred between GPUs, whether the GPUs are operating efficiently, whether the workload is sufficiently balanced, etc. In other embodiments, the GPU-to-GPU error rate may be monitored, for example for purposes of system maintenance. In these and other embodiments, such monitoring may enable alerts to a user to allow for diagnosing software (e.g., training model or framework) and/or hardware issues.

Existing solutions typically lack such near-real-time GPU-to-GPU traffic monitoring capability. For example, command-line tools provided by vendors of special-purpose processing units (e.g., the nvidia-smi tool) do not provide such capabilities.

Other solutions typically either require application-level code modification or are significantly slower because of high overhead during tracing. Further, such methods may also lack the ability to map the traffic monitoring according to the physical GPU topology and lack advanced diagnostic analytics capabilities.

According to embodiments of this disclosure, however, a real-time or near-real-time GPU-to-GPU traffic monitoring solution may be provided by adding one or more software modules as described below, which may map the physical hardware topology and provide the diagnostic analytics capabilities that existing solutions lack. Such analytics may help users to better understand data aspects while tuning deep learning models, and they may also be integrated with existing tools such as cluster management systems.

Figure 3:
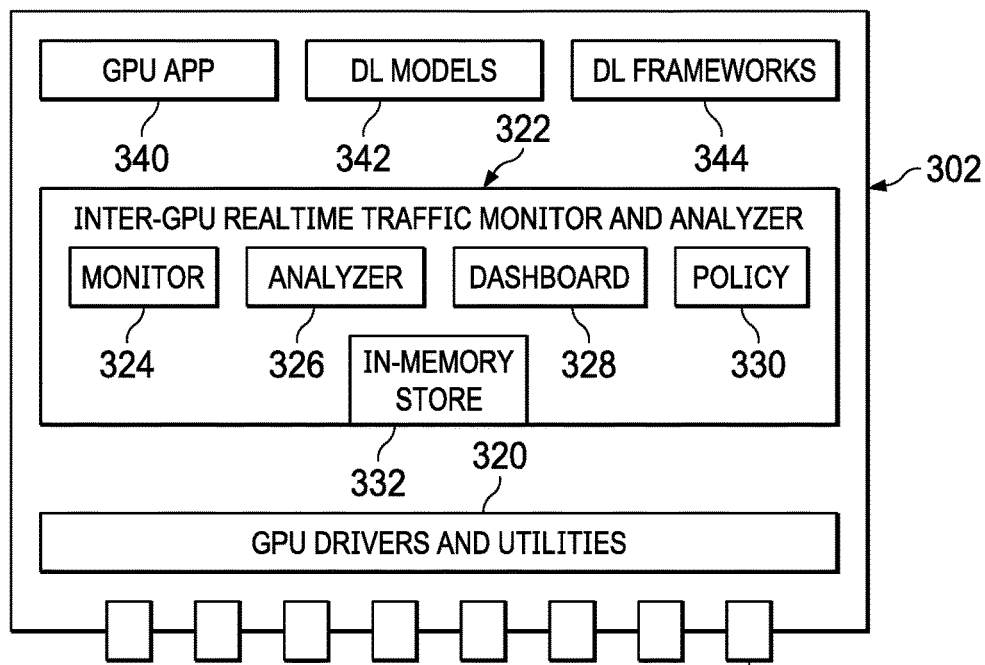
FIG. 3 illustrates an functional block diagram of components, in accordance with embodiments of the present disclosure.

Turning now to FIG. 3, a block diagram of a module framework is shown, according to embodiments of this disclosure. Information handling system 302 may include a plurality of GPUs 310. A low-level layer of GPU drivers and utilities 320 may allow hardware interfacing between GPUs 310 and the remainder of information handling system 302. A high-level layer including GPU application 340, deep learning models 342, and deep learning frameworks 344 may comprise the software that is ultimately desired to be run on GPUs 310.

As shown in FIG. 3, inter-GPU real-time traffic monitor and analyzer 322 may run on top of the layer of GPU drivers and utilities 320. Inter-GPU real-time traffic monitor and analyzer 322 may include monitor 324, analyzer 326, dashboard 328, policy 330, and in-memory store 332.

Monitor 324 may run as a background daemon process that repeatedly collects GPU-to-GPU traffic status data points according to a pre-defined policy, updating in-memory store 332 with the raw data collected. For example, monitor 324 may monitor traffic levels between every pair of GPUs, considering each as both a source and as a target for data transfer.

In some embodiments, monitor 324 may leverage underlying GPU vendor tools (such as nvidia-smi as mentioned above) or system drivers/utilities (e.g., the PCM-pcie tool) to provide hardware-level information collection. Further, monitor 324 may be capable of automatically resetting relevant counters based on the monitoring policy. For example, monitor 324 may automatically reset existing NVLink statistics at the end of every monitoring interval (which may be set by policy, for example every 3 seconds), and collect traffic status points in the current timestamp window, then inject those status points into in-memory store 332.

In other embodiments, monitor 324 may itself implement PCIe, NVLink, or other appropriate low-level APIs, and expose a library or API to userspace programs for monitoring. In any event, the overhead of executing monitor 324 may have at most a minimal impact on performance.

In-memory store 332 may provide status history of raw GPU-to-GPU traffic, which can be further transformed and analyzed by analyzer 326, as described in further detail below. Typical information in in-memory store 332 may include metrics such as jobID, timestamp, source GPU (srcGPU), target GPU (tgtGPU), and monitor metrics (e.g., read size, write size, etc.). In-memory store 332 may include a key-value database, a time-series database, a graph database (e.g., with vertices as GPUs and edges as traffic amounts) with checkpoint (denoting different timestamps), or any other suitable data structure. One set of example data for a particular time period is shown below at Table 1.

TABLE 1

| JobID (or processID and job start cmd) | timestamp | srcGPU | tgtGPU | Stats item |
|---|---|---|---|---|
| Job1 | Timestamp1 | GPU0 | GPU1 | 100 MB |
| Job1 | Timestamp1 | GPU0 | GPU2 | 200 MB |
| Job1 | Timestamp1 | GPU1 | GPU2 | 400 MB |
| Job1 | Timestamp2 | GPU0 | GPU1 | 50 MB |
| ... | | | | |

In some embodiments, a GPU interconnect topology information module (not shown in FIG. 3) may also be included and provide input to analyzer 326. As noted above, information handling system 302 may include any of various possibilities for the connection topology or bus type for GPUs 310. Topology info can be collected via system utilities or GPU vendor utilities (such as "lspci -tv" or "nvidia-smi topo -m"). The collected GPU topology information may be used for at least two purposes according to this disclosure: first, during performance analysis, it may be desirable to be aware of the topology, so that analyzer 326 can accurately evaluate the current performance behavior. For example, if GPUs 310 are connected via NVLink 2.0 but are only achieving 1 GB/sec, that data may indicate an abnormality. Second, in the display of dashboard 328, traffic and performance statistics may be shown in terms of the detected GPU topology (e.g., as a graph GUI) thus illustrating the GPU-to-GPU performance data in an intuitive way, such as by including different edge sizes to denote traffic amount and color to denote abnormal statuses.

Analyzer 326 may continually receive the raw GPU-to-GPU status information from in-memory store 332 and perform various pre-defined analysis tasks. Analyzer 326 may work in a streaming processing fashion.

One typical type of analytics task may include traffic imbalance detection, e.g., for distributed deep learning training jobs. Deep learning frameworks like TensorFlow may partition parameters across all GPUs 310 (for example when using a parameter server), and ideally each GPU 310 should take an equal size of parameters such that the parameter exchange across GPUs would be perfectly balanced. However, this may not always be the case in practice, depending on models and frameworks. Detecting imbalanced traffic may be accomplished, for example, by determining the busiest link and the least-busy link from data residing in in-memory store 332, and by calculating an imbalanceFactor as defined below at Equation 1. A higher value of the imbalanceFactor denotes a worse imbalance problem.

$$imbalanceFactor = \frac{\text{highest traffic link}\left(\frac{MB}{\text{sec}}\right)}{\text{lowest traffic link}\left(\frac{MB}{\text{sec}}\right)} \quad (1)$$

Similarly, the most utilized GPU (hottestGPU) may be determined, for example, by aggregating and comparing the total traffic amount for each GPU, as shown at Equation 2, and then determining the GPU with the maximum value. In various embodiments, traffic sent to a GPU, traffic received from the GPU, or total aggregate traffic may be used.

$$\text{totalTraffic}(GPU_n) = \Sigma_{i \neq n} \text{traffic}(GPU_n, GPU_i) \quad (2)$$

Another typical analytics task may include performance abnormality detection. For example, based on an input GPU topology and traffic status data, analyzer 326 may determine the relevant metrics (e.g., in terms of MB/sec) and then evaluate the measured performance behavior compared to an expected value based on the bus hardware's specified performance. A pre-defined criterion such as 50% may be set such that performance below that level may generate an alert.

Yet another typical analytics task may include error rate detection. Analyzer 326 may collect data regarding the transmission error rates, and if these rates exceed a specified threshold, an alert may be generated.

Dashboard 328 may be used to show visualizations of GPU-to-GPU traffic status and other metrics. In some embodiments, dashboard 328 may be implemented as a user-friendly web-based GUI, and it may showcase specific GPU-X to GPU-Y data transmission in terms of traffic size (MB), or performance (MB/sec). Depending on results provided by analyzer 326 and various policy settings, dashboard 328 may highlight abnormal performance issues in different colors, provide warning messages, etc. In some embodiments, dashboard 328 may receive data from a GPU interconnect topology information module to assist with data visualization.

Finally, policy 330 may be a module that enables users to configure relevant behaviors for inter-GPU real-time traffic monitor and analyzer 322. For example, a user may set a monitoring interval (e.g., in terms of seconds), an imbalance criterion (such as imbalanceFactor>5), a performance abnormality criterion (such as speed falling below 50% of the bus hardware's specified performance), an error rate threshold (such as 10 errors per minute), etc. When violations of such policies are detected by analyzer 326, alerts may be generated via dashboard 328. An example visualization is shown and described below with regard to FIG. 5.

Figure 4:
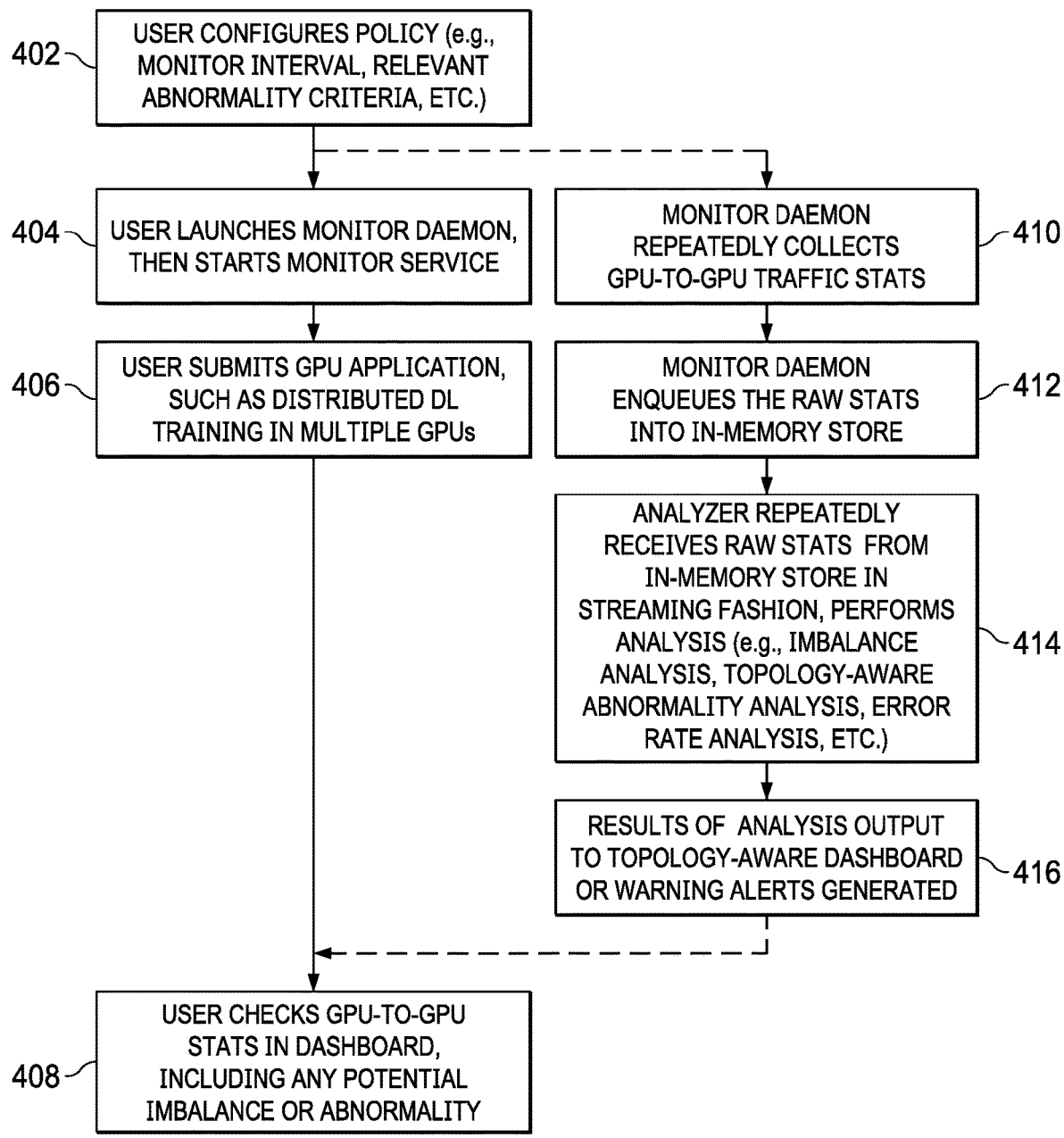
FIG. 4 illustrates an example flow diagram, in accordance with embodiments of the present disclosure.

FIG. 4 illustrates a flow chart of an example method 400 in accordance with embodiments of the present disclosure. According to certain embodiments, method 400 may begin at step 402. As noted above, teachings of the present disclosure may be implemented in a variety of configurations of information handling system 102. As such, the preferred initialization point for method 400 and the order of the steps comprising method 400 may depend on the implementation chosen. In these and other embodiments, method 400 may be implemented as hardware, firmware, software, applications, functions, libraries, or other instructions.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

At step 402, a user of an information handling system configures at least one monitoring policy for GPU-to-GPU traffic. For example, the policy may include a time interval for periodic traffic monitoring, criteria that may represent performance abnormalities, unacceptable levels of error rates, etc.

At step 404, the user launches a monitor daemon and starts a monitor service. For example, these components may be as described above with respect to monitor 324.

At step 406, the user then launches a GPU application as normal. For example, a distributed deep learning training task may be initiated across multiple GPUs.

Meanwhile, at step 410, the monitor daemon repeatedly collects GPU-to-GPU traffic statistics as raw data. The monitor daemon then enqueues the raw data collected into an in-memory store at step 412.

At step 414, an analyzer repeatedly receives raw statistics data from the in-memory store in a streaming fashion and performs various analyses on the data. For example, imbalance analysis, topology-aware abnormality analysis, error rate analysis, and any other type of analysis may be performed.

The results of such analysis are output to a topology-aware dashboard at step 416. Further, any necessary alerts may be generated. Such alerts may be communicated in any suitable manner, such as by displaying them on the dashboard, generating an email, etc.

At step 408, the user reviews the analysis results in the dashboard and receives any alerts that may have been generated.

Figure 5:
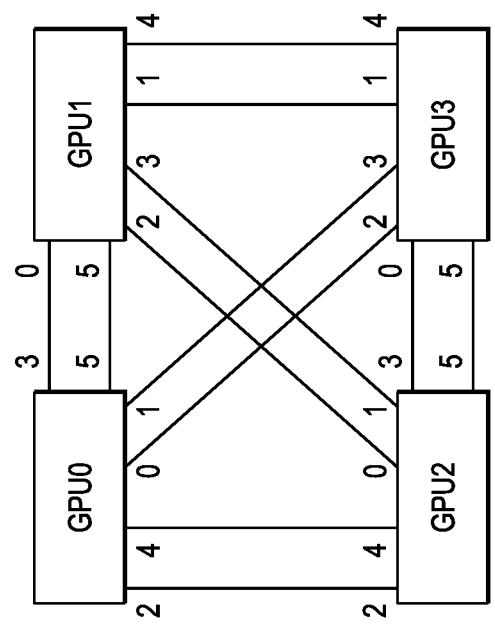
FIG. 5 illustrates an example visualization, in accordance with embodiments of the present disclosure.

Turning now to FIG. 5, an example data visualization is shown. In the illustrated embodiment, each GPU has six GPU-to-GPU data connections, and so every respective pair of GPUs is configured to use two of such connections. In other embodiments, for example, if more than four GPUs are used, it may be the case that some GPUs are not directly connected to some other GPUs.

In FIG. 5, different shading is used to indicate different traffic levels. In other embodiments, colors such as green, yellow, and red may be used. As can be readily seen from this example visualization, GPU2 is the most utilized.

Further, significant traffic imbalances exist for some GPUs. The "busy ratio" column indicates, for each GPU, the ratio of traffic on its busiest link to traffic on its least-busy link. GPU2, for example, has relatively balanced traffic with a ratio of 1.1. GPU3, in contrast, has a ratio of 8.9, indicating possible problems that the user may need to address.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one central processing unit (CPU); and
   a plurality of special-purpose processing units;
   wherein the information handling system is configured to:
   execute a driver program for controlling the plurality of special-purpose processing units, wherein the driver program is configured to access a counter repeatedly to monitor amounts of data traffic exchanged between respective pairs of the special-purpose processing units during selected time periods that are determined based on a monitoring policy;
   subsequent to each selected time period, cause the counter to be reset;
   based on the monitored amounts of data traffic, determine an amount of traffic imbalance for the plurality of special-purpose processing units; and
   in response to the amount of traffic imbalance exceeding a threshold amount, transmit a notification indicative of the amount of traffic imbalance.

2. The information handling system of claim 1, wherein the special-purpose processing units are graphics processing units (GPUs).

3. The information handling system of claim 2, wherein the GPUs are configured as general-purpose graphics processing units (GPGPUs).

4. The information handling system of claim 1, wherein the repeatedly monitoring comprises periodically monitoring.

5. The information handling system of claim 1, wherein the information handling system is further configured to:
   determine a most-utilized one of the plurality of special-purpose processing units.

6. The information handling system of claim 1, wherein the information handling system is further configured to:
   provide a real-time graphical display indicative of the amounts of data traffic.

7. The information handling system of claim 6, wherein the real-time graphical display is further indicative of a topology of the plurality of special-purpose processing units.

8. The information handling system of claim 1, wherein the at least one CPU is a component of a management controller of the information handling system.

9. A method comprising:
   executing a driver program for controlling a plurality of special-purpose processing units of an information handling system, wherein the driver program is configured to access a counter repeatedly to monitor amounts of data traffic exchanged between respective pairs of the plurality of special-purpose processing units during selected time periods that are determined based on a monitoring policy;
   subsequent to each selected time period, causing the counter to be reset;
   based on the monitored amounts of data traffic, determining an amount of traffic imbalance for the plurality of special-purpose processing units; and
   in response to the amount of traffic imbalance exceeding a threshold amount, transmitting a notification indicative of the amount of traffic imbalance.

10. The method of claim 9, wherein the repeatedly monitoring occurs once per second.

11. The method of claim 9, further comprising:
    determining, based on the monitored amounts of data traffic, respective utilization levels for each of the plurality of special-purpose processing units.

12. An article of manufacture comprising a non-transitory, computer-readable medium having computer-executable instructions thereon that are executable by a processor of an information handling system for:
    executing a driver program for controlling a plurality of special-purpose processing units of an information handling system, wherein the driver program is configured to access a counter repeatedly to monitor amounts of data traffic exchanged between respective pairs of the plurality of special-purpose processing units during selected time periods that are determined based on a monitoring policy;
    subsequent to each selected time period, causing the counter to be reset;
    based on the monitored amounts of data traffic, determining an amount of traffic imbalance for the plurality of special-purpose processing units; and
    in response to the amount of traffic imbalance exceeding a threshold amount, transmitting a notification indicative of the amount of traffic imbalance.

13. The article of claim 12, wherein the special-purpose processing units are graphics processing units (GPUs).

14. The article of claim 12, wherein the processor is a component of a management controller of the information handling system.

15. The article of claim 12, wherein the processor is a component of a host system of the information handling system.

16. The article of claim 12, wherein the instructions are further for:

determining a most-utilized one of the plurality of special-purpose processing units.

17. The article of claim 12, wherein the instructions are further for:

providing a real-time graphical display indicative of the amounts of data traffic.

18. The article of claim 17, wherein the real-time graphical display is further indicative of a topology of the plurality of special-purpose processing units.

\* \* \* \* \*